Sept. 7, 1937.  F. I. GILBERT  2,092,452
AUTOMATIC DOWNSTREAM CHECK VALVE
Filed March 24, 1934  2 Sheets-Sheet 2
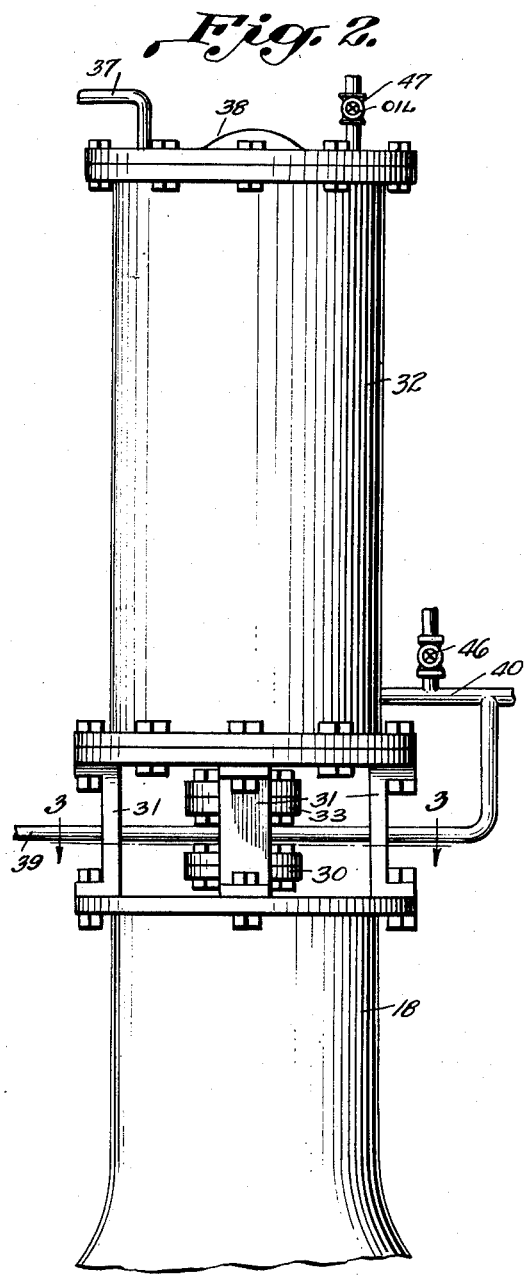
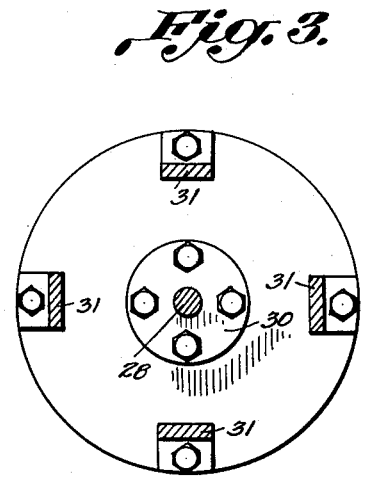
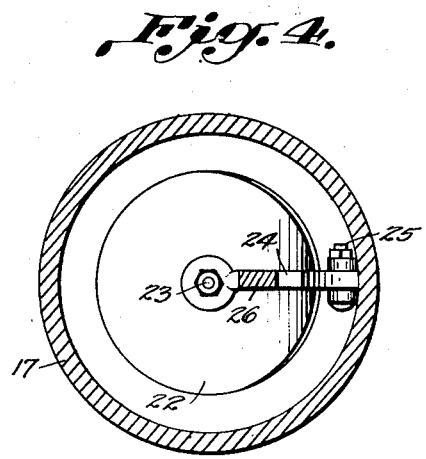
Inventor
Forrest I. Gilbert
By Miller & Miller
Attorneys Patented Sept. 7, 1937

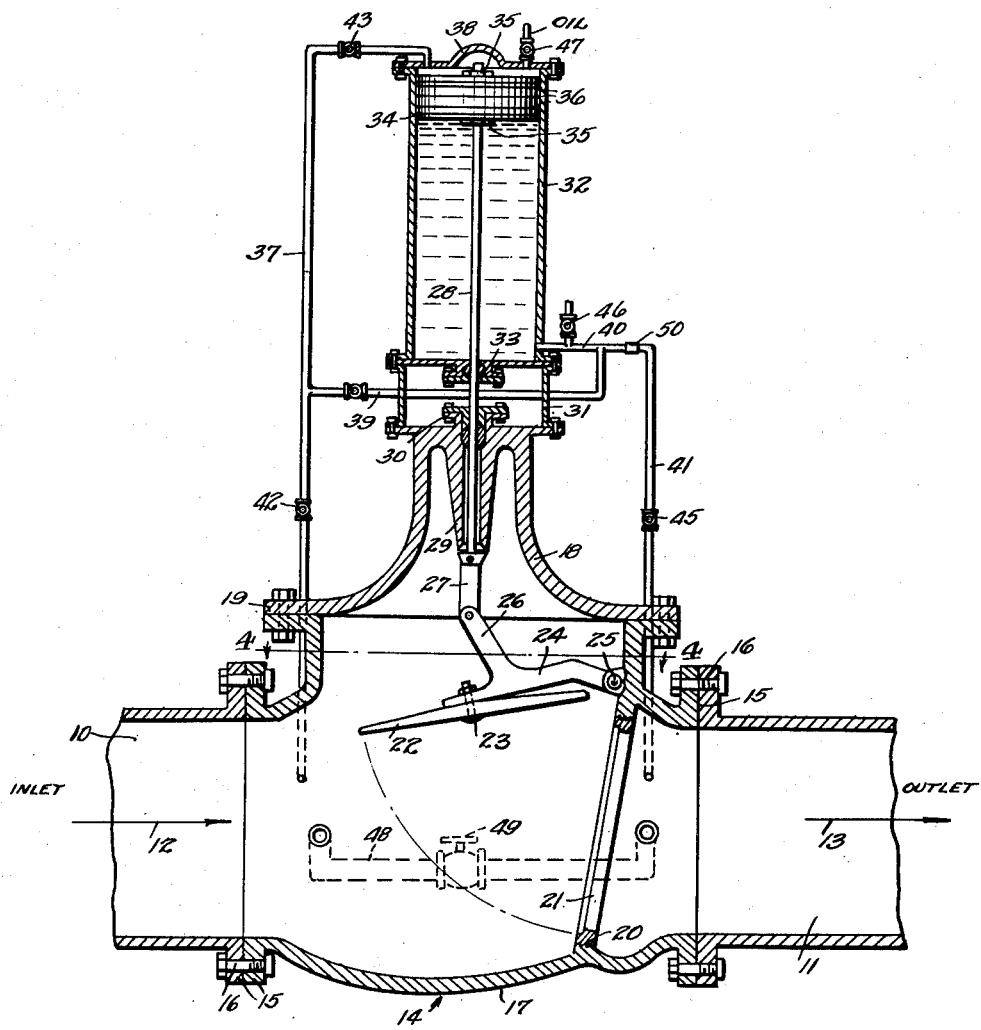

2,092,452

UNITED STATES PATENT OFFICE 2,092,452

AUTOMATIC DOWNSTREAM CHECK VALVE

Forrest I. Gilbert, Rocky Ford, Colo.

Application March 24, 1934, Serial No. 717,231

1 Claim. (Cl. 137—153)

This invention relates to an automatic downstream check valve and has for an object to provide an improved check valve for stopping the flow of gas or fluid in case of a break in the gas or fluid line. The purpose of this invention is to prevent loss of the gas or other fluid in case of a break in the line, in that it automatically stops the flow of the gas or fluid through the line whenever a break occurs. This invention is intended to be installed in lines at river crossings or elsewhere wherever there is a possibility of damage through a breaking line for any reason.

A further object of this invention is to provide a check valve in a gas or other line which is normally held open by means of a piston held in uplifted position by the normal pressure in the line, which piston is allowed to drop if the pressure drops as a result of a break, bringing the check valve into the path of flow of the fluid, and causing the check valve to move positively to a closed locking position.

Still a further object of this invention is to provide a piston for operating a check valve in case of a break in the line, which piston is connected by suitable lines on both sides of the piston head so that the piston may be manipulated within its cylinder for lubricating the same at suitable intervals, preventing the piston from freezing or rusting within the cylinder.

With the foregoing and other objects in view, as will hereinafter become apparent, this invention comprises the constructions, combinations and arrangements of parts hereinafter set forth, disclosed and shown on the accompanying drawings. In these drawings, Figure 1 is a vertical section of the invention, Figure 2 is a side elevation of the cylinder mounted on the valve, Figure 3 is a sectional view taken on the line 3—3 of Figure 2, and Figure 4 is a sectional view taken on the line 4—4 of Figure 1.

There is shown at 10 and 11 a gas or fluid line normally carrying any type of fluid whether gases or liquids at a normal pressure therethrough, the gas or fluid flowing in the direction of the arrows 12 and 13 from the inlet pipe section 10 to the outlet pipe section 11. The automatic downstream check valve 14 constituting this invention is suitably connected between the pipe sections 10 and 11 by means of their flanges 15 and bolts and nuts 16, thus enabling the check valve 14 to be inserted in the pipe lines 10 and 11 at any suitable position. This check valve 14 comprises a T-shaped check body 17 on which is mounted a concave bonnet 18 by means of the flange connection 19. The check body 17 has an internal thread 20 for receiving a ringed valve seat 21. This valve seat 21 cooperates with the check valve 22 which when in the closed position prevents any flow of fluid or gas to the outlet section of the pipe 11.

This check valve 22 is secured by the bolt 23 to the valve swing 24 which is pivoted on a hinge lug 25 to one side of the check body 17. This valve swing 24 has an arm 26 pivoted to a connecting link 27, the link 27 in turn being pivoted to the piston rod 28. The piston rod 28 extends through the rod guide 29 in the bonnet 18 and through the packing gland 30 on the bonnet 18. Supported above the bonnet 18 by means of feet 31, preferably four in number, is a cylinder 32 into which extends the piston rod 28 through the packing gland 33.

The piston rod 28 is connected to a piston 34 by means of jam nut 35 and the piston 34 is provided with three piston rings 36 so as to prevent leakage of any pressure from one side of the piston 34 to the other side within the cylinder 32, the cylinder 32 being of appropriate size according to the size of the pipe 10—11, that it is to be used with. A line 37, preferably three-eighths of an inch in diameter, connects the inlet side of the check body 17 to the upper side of the cylinder 32 above the piston 34, through the cylinder head 38. A by-pass line 39 connects the line 37 to the cylinder 32 below the piston 34 through the connection 40 into the cylinder.

Another line 41 leads from the connection 40 to the outlet side of the check body 17 on the other side of the valve seat 21. The line 37 is provided with a three-eighths inch gate valve 42 and 43 on each side of its connection to the by-pass line 39, and the by-pass line 39 is provided with a similar gate valve 44. The line 41 is likewise provided with a similar gate valve 45. The line connection 40 to the cylinder 32 is provided with a cylinder relief valve 46 so as to allow the pressure below the piston 34 to escape when desired, and the cylinder head 38 is provided with a similar relief and oil admission valve 47, which may be used both for allowing the escape of any pressure on the top of the piston 34 as well as for allowing admission of oil through the cylinder head 38 for lubricating the piston.

The check body 17 is provided with a by-pass line 48 leading to opposite sides of the valve seat 21 and provided with a suitable gate valve 49. In operation, the gate valves 42, 43, and 44 and the cylinder relief valve 46 are normally maintained in closed position, while the gate valve 45 and the tri-cock valve 47 are normally maintained in open position. With the valves in these positions the pressure in the gas or fluid lines 10 and 11 exerts itself through the line 41 and connection 40 to the cylinder 32 below the piston 34, maintaining it in the raised position shown. If a break should occur in the outlet section 11 of the line then the pressure will drop off as it escapes, reducing the pressure on the line 41 and withdrawing the support from beneath the piston 34 and the cylinder 32. As soon as the piston 34 starts to move in a downward direction, the valve 22 is brought into the path of the pressure through the lines 10 and 11 assisting the valve 22 in moving the valve swing 24 about its pivot 25 until it seats against the valve seat 21, blocking off the escape of any further fluid through the pipe 11. To prevent the piston 34 from striking the bottom of the cylinder too rapidly, an orifice or pressure reducing connection 50 is provided in line 41.

As will be apparent, it will be desirable that the piston 34 be well lubricated within the cylinder 32 so that no pressure may escape thereby, and further that it will not rust or freeze within the cylinder. In order to lubricate the piston within the cylinder, oil is introduced through the tri-cock valve 47 to the top of the piston 34. In order to cause a thorough lubrication of the cylinder walls, the piston 34 may be caused to move up and down several times within the cylinder 32 by proper manipulation of the gate valve. Thus, in order to move the piston 34 downwardly the valves 44 and 45 are placed in closed position. Escape valve 46 is placed in open position while the tri-cock valve 47 is placed in closed position. The gate valves 42 and 43 are then opened whereby pressure will pass through the line 37 to the top of the piston 34, the pressure beneath the piston escaping through the open escape valve 46, moving the piston downwardly. The gate valve 49 on the by-pass 48 should be opened meanwhile and remain open to allow the continuous flow of the gas or fluid about a temporarily closed check valve 22 and thus eliminate such a pressure differential on the face of valve 22 that might prevent the subsequent opening thereof. In order to raise the piston 34 and again open the check valve 22, the tri-cock valve 47 is opened and the escape valve 46 is closed. Gate valve 44 on by-pass line 39 is open, while gate valve 43 on line 37 is closed. This will lead pressure to the bottom of the piston 34, while the pressure on top of the piston escapes through the tri-cock valve 47. The same procedure of first opening by-pass gate valve 49 is followed when reopening valve 22 after it has automatically closed for any reason.

After the piston 34 has been thus manipulated up and down several times sufficient to thoroughly lubricate the cylinder walls, the different valves are then again set in proper position for automatic operation so as to hold the piston 34 in the raised position until a break occurs in the line 11 reducing the pressure on line 41 and automatically closing the check valve 22.

As will be observed, the check valve 22 in open position is substantially out of the path of the pressure of the gas or fluid through the pipes 10—11, but as soon as it starts to close it gets into the path of this pressure so that the pressure assists in the closing operation.

The novel features and the operation of this device will be apparent from the foregoing description. While the device has been shown and the structure described in detail, it is obvious that this is not to be considered limited to the exact form disclosed, and that changes may be made therein within the scope of what is claimed without departing from the spirit of the invention.

Having thus set forth and disclosed the nature of this invention, what is claimed is:

An automatic downstream check valve comprising a body member having a horizontal opening therethrough and a flanged open top in communication with the horizontal opening, the body member being flanged at opposite ends for removable connection in a fluid or gas line and being provided with a removable valve seat adjacent the outlet end thereof, a bonnet removably secured to the flanged open top of the body member and having an elongated piston rod guide interiorly thereof in vertical alignment with the center of the open top in the body member, a cylinder in vertical axial alignment with the guide, the bottom of the cylinder being supported above the bonnet by a plurality of feet, vertically spaced packing glands supported by the top of the bonnet and the bottom of the cylinder, a piston movably disposed within the cylinder, a piston rod extending through the guide and packing glands with the upper end thereof secured to the piston and the lower end thereof projecting below the lower end of the guide, a valve swing pivotally connected to the body member immediately above the valve seat, a check valve carried by the valve swing for cooperation with the valve seat, the valve swing including an angularly disposed arm the outer end of which is pivotally connected to one end of a link whose opposite end is pivotally connected to the lower end of the piston rod, a conduit line connecting the cylinder on the lower side of the piston to the body member on the outlet side of the valve seat for normally holding the piston at the upper end of the cylinder by unobstructed pressure of fluid or gas flowing through the body member and with the valve swing in such position that the check valve is disposed substantially horizontally above the flow of fluid or gas through the body member, the piston being freely movable downwardly in the cylinder upon reduction of pressure at the outlet side of the valve seat which through the piston rod and valve swing operates to move the check valve toward the valve seat and into the line of flow of fluid or gas which assists in moving the check valve into closing engagement with the valve seat, and means for reciprocating the piston within the cylinder for lubricating same comprising in combination with the first conduit line a second conduit line connecting the cylinder above the piston with the body member at the inlet end thereof, a by-pass conduit connecting the first and second named conduit lines, a combined oil admission and relief valve at the top of the cylinder, a relief valve adjacent the bottom of the cylinder, gate valves in the first and second named conduit lines, and the by-pass conduit for alternately admitting fluid pressure above and below the piston within the cylinder, and a by-pass connection in the body member for permitting unobstructed flow of fluid or gas when the check valve is temporarily closed.

FORREST I. GILBERT.